United States Patent [19]

Mercier

[11] 3,963,052

[45] June 15, 1976

[54] PRESSURE VESSEL

[76] Inventor: Jacques H. Mercier, 49 rue de Naples, Paris, France

[22] Filed: Feb. 20, 1973

[21] Appl. No.: 334,155

[52] U.S. Cl. .............................. 138/30; 220/85 B
[51] Int. Cl.² ......................................... F16L 55/04
[58] Field of Search .................... 220/85 B; 138/30

[56] References Cited
UNITED STATES PATENTS

| | | | |
|---|---|---|---|
| 2,878,834 | 3/1959 | Mercier | 138/30 |
| 3,088,492 | 5/1963 | Mercier | 138/30 |
| 3,109,458 | 11/1963 | Mercier | 138/30 |
| 3,195,576 | 7/1965 | Mercier | 138/30 |
| 3,500,866 | 3/1970 | Greer | 138/30 |
| 3,654,964 | 4/1972 | Mercier et al. | 138/30 |
| 3,690,347 | 9/1972 | Zahid | 138/30 |

*Primary Examiner*—George E. Lowrance
*Attorney, Agent, or Firm*—Arthur B. Colvin

[57] ABSTRACT

This invention relates to a pressure vessel and more particularly to a pressure accumulator having a substantially cylindrical body portion with a port at one end and a mouth at the other with a cover member adapted to close such mouth and also having a port. An annular supporting member of rigid sheet metal is positioned in the pressure vessel and has a deformable bladder having a rim bonded to the supporting member and defining two variable volume chambers therein in communication respectively with such ports. The supporting member has a first positioning means including abutment means formed integral therewith cooperating with the mouth of said cylindrical body portion to center the supporting member and bladder in the pressure vessel and has a second positioning means including abutment means also formed integral therewith and cooperating with said cover member to position the latter in axial alignment with said body portion, and weld means are provided to retain said body portion, said cover member and said supporting member in fixed position.

14 Claims, 8 Drawing Figures

PRESSURE VESSEL

As conducive to an understanding of the invention it is noted that in the assembly of pressure vessels of the type comprising a cylindrical body portion or container having a port at one end and a mouth at the other end closed by a cover member having a port and having a deformable partition therein in the form of a bladder having an enlarged mouth bonded to an annular supporting member, which is positioned in the container, it is essential that the supporting member be properly located in the container so that the bladder is axially aligned with the port in the container.

Where to insure such precise alignment, special precautions must be taken requiring the use of locating jigs or stops to limit the position of the supporting member, the assembly time of the unit is increased with consequent increase in the cost of manufacture and still with the possibility that proper alignment is not achieved.

It is accordingly among the objects of the invention to provide a pressure vessel of the above type in which the assembly of the container, the cover member and the supporting member with the separator bonded thereto may rapidly be accomplished with assurance that the components are properly aligned without the need for jigs, special tools or markings and based solely on the configuration of the components themselves.

According to the invention, these objects are accomplished by the arrangement and combination of elements hereinafter described and more particularly recited in the claims.

In the accompanying drawings in which are shown one or more of various possible embodiments of the several features of the invention, FIG. 1 is a longitudinal sectional view of a pressure accumulator according to one embodiment of the invention;

Figure 2:
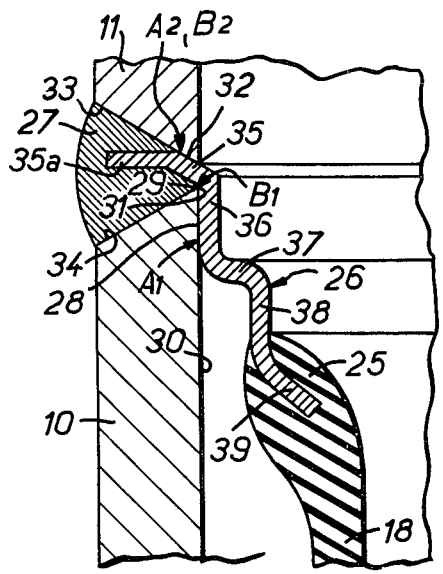
FIG. 2 is a detail sectional view on an enlarged scale of the embodiment shown in FIG. 1.

FIG. 3 to FIG. 7 inclusive are views similar to FIG. 2 of different embodiments of the invention.

Figure 1:
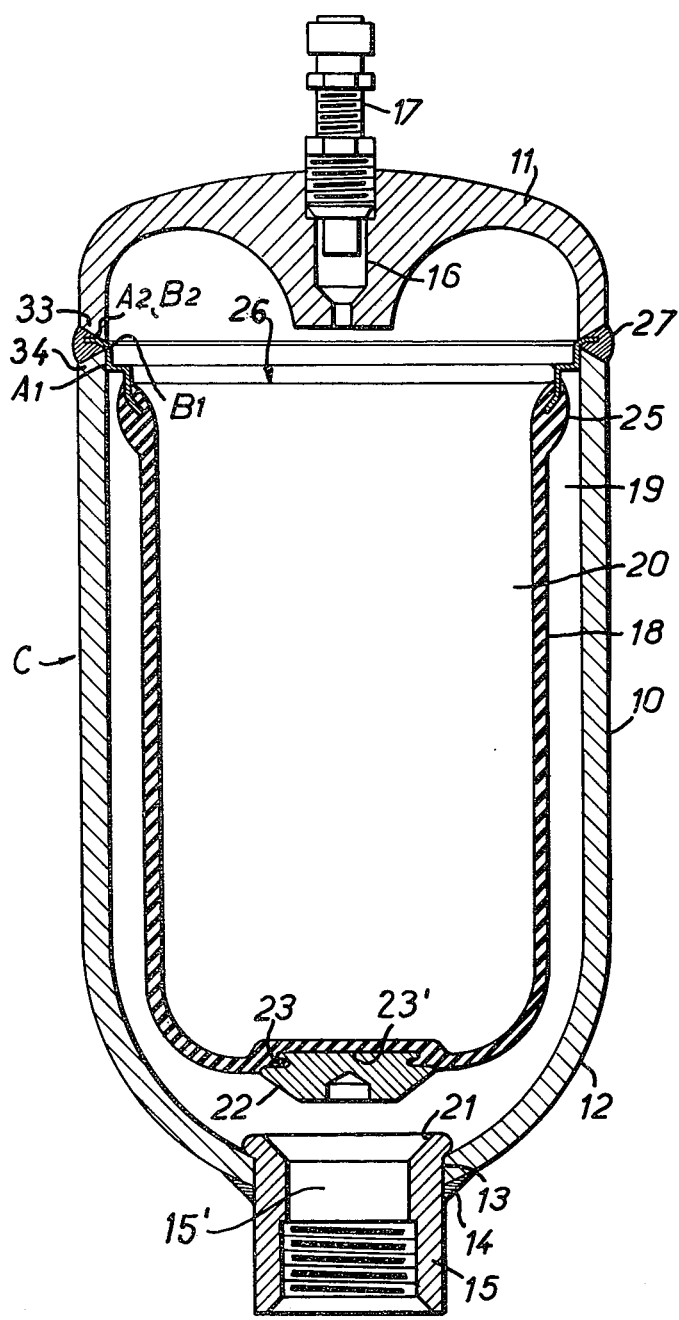

Referring now to the drawings, the invention is incorporated in a pressure vessel, illustratively a pressure accumulator which, as shown in FIG. 1, comprises a container C of rigid metal capable of withstanding relatively high pressure. The container comprises two complementary cup-shaped shells 10 and 11, the rims 34, 33 of the mouths of which are substantially of the same diameter and are beveled so that the resultant triangular annular recess that will be formed when the rims are juxtaposed will have its apex directed inwardly.

The shell 10 which defines the body portion of the container is substantially cylindrical and has a rounded end 12 with an axial opening 13 adapted to receive a hollow fitting 15 secured in position as by welding at 14 and which defines the oil port 15'.

The shell 11 defines a cover member having a cylindrical side wall and a curved top wall having an axial port 16 in which a suitable gas valve 17 is positioned.

Positioned in the container C is a flexible deformable partition 18 which may be of rubber or of material having like characteristics. The partition illustratively is a bladder having an enlarged mouth with a thickened rim 25 and said bladder is designed to be positioned in the shell 10. The bladder divides the container into two variable volume chambers, i.e., a gas chamber 20 in communication with the port 16 and an oil chamber 19 in communication with the port 15'.

As previously noted, the port 16 is controlled by a valve 17. To control the port 15', the inner end of which defines a beveled valve seat 21, the free end of the bladder 18 has a button 22 secured thereto and axially aligned with the longitudinal axis of the bladder 18. The button is of material harder than that of the bladder and may, for example, be of neoprene, aluminum or other suitable material. As is clearly shown in the drawing, the outer surface of the button has the form of a frustum of a cone and is of configuration so that it may seat on the beveled valve seat 21 to close the port 15'.

The button at the larger diameter portion thereof has an annular groove 23 in its periphery and the button is molded integrally with the bladder so that the bladder material will enter the annular groove 23 and will also extend over the top surface 23' of the button.

According to the invention, the bladder 18 has its mouth 25 secured as by bonding to the edge of an annular supporting member or belt 26 of relatively thin, but rigid sheet metal, the supporting member preferably being joined to the bladder during the molding thereof.

In the manner hereinafter to be described, the shells 10 and 11 and the supporting member 26 are joined together by a weld as at 27.

In order to insure that the shells 10, 11 and supporting member 26 will be joined in proper manner, they are formed so that they may readily be pre-positioned before welding, without any special precautions being taken.

To this end, as shown in FIG. 1, the annular supporting member 26 has a first positioning means including centering means A1 and an abutmemt B1 both associated with the shell 10 and a second positioning means including centering means and abutment means A2, B2, both associated with the shell 11.

Figure 3:
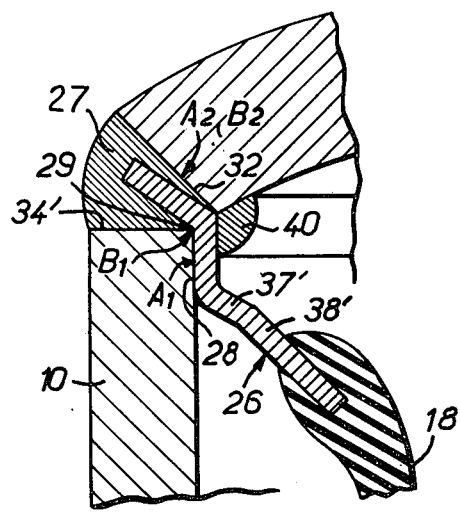

More particularly, as shown in enlarged scale in FIGS. 2 and 3, the annular supporting member 26 has a curved inwardly extending mounting portion 39 at its lower edge to which the thickened mouth 25 of the bladder 18 is bonded. Rising from the curved portion 39 is a cylindrical portion 38 which has a laterally extending spacer portion 37 at its upper edge. Rising from the outer edge of spacer portion 37 is a cylindrical centering portion 36 having an outer bearing surface 28 which defines the first positioning means A1.

Extending outwardly from the upper edge 29 of cylindrical centering portion 36 is a frusto-conical portion 35 which has a plane flange 35a extending laterally outward from the upper edge thereof, the recess formed by the junction 29 between portion 35 and flange 35a defining abutment B1. The outer face of portion 35 defines the bearing surface 32. This bearing surface forms the second positioning means and abutment A2, B2.

As is clearly shown in FIGS. 1 to 3, the cylindrical bearing surface 28 (A1) of supporting member 26 cooperates with the inner wall surface 30 of shell 10 and the recess 29 (B1) cooperates with the inner sharp edge 31 or beveled rim 34.

Similarly, the conical bearing surface 32 (A2, B2) of supporting member 26 cooperates with beveled rim 33 of shell 11.

Figure 2A:
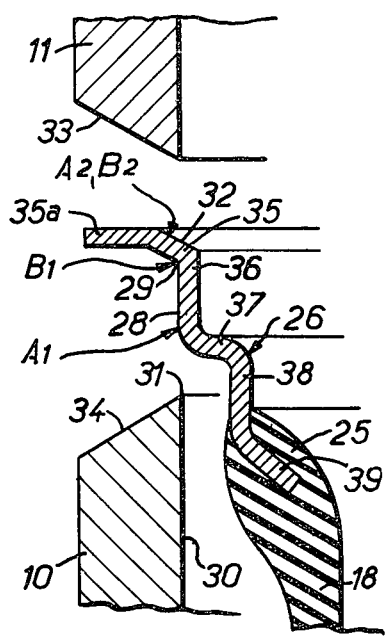
FIG. 2a is an exploded view similar to FIG. 2 but prior to assembly.

To assemble the pressure vessel, the bladder 18 with its supporting member 26 is positioned in shell 10 as shown in FIG. 2a. The outer diameter of bearing surface 28 (A1) of cylindrical portion 36 is just slightly less than the diameter of inner bearing surface 30 of shell 10 so that when the supporting member 26 is moved into the shell 10 until the sharp edge 31 abuts against abutment or recess 29 (B1), the bladder will be centered in shell 10. By reason of the lateral spacer portion 37, the rim 25 and body of the bladder will be spaced from the wall surface 30 of shell 10 to minimize the heat transferred thereto during the welding operation thereby preventing injury to the bladder.

Thereupon, the shell or cover member 11 is positioned so that the beveled rim 33 thereof will seat and center on conical portion 32 (A2, B2).

It is to be noted that the assembly above described by reason of the configuration of the rims 33, 34 and the annular supporting member 26, will automatically center the supporting member and the bladder and align the rims 33, 34 without any special tools or jigs.

Thereupon, to complete the assembly, it is merely necessary to form a weld bead 27 in the triangular recess defined between beveled rims 33, 34 to unite the shells 10, 11 and annular supporting member 26 and to form a leak-proof seal.

In the embodiment shown in FIG. 3, the arrangement is similar to that shown in FIGS. 1 and 2, except that the beveled rim 34 is replaced by a plane rim 34'. The positioning means A1, B1; A2, B2 comprise for A1 a cylindrical bearing surface 28; for B1 a recess 29 and for A2, B2 the conical bearing surface 32.

In FIG. 3, the supporting member 26 has substantially the same form as in FIGS. 1 and 2 except that the spacer portion 37 and cylindrical portion 38 are replaced by conical portions 37', 38' which as in FIG. 2, keep the bladder 18 away from the wall of shell 10. It is to be noted that the weld bead 27 projects inwardly as at 40.

Figure 4:
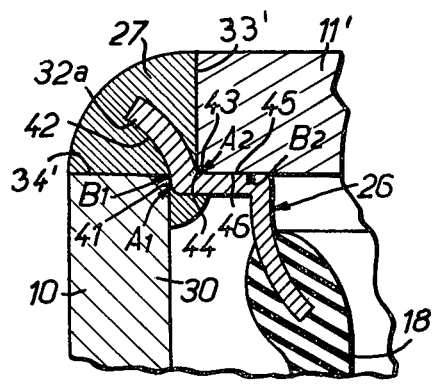

In the embodiment shown in FIG. 4, the first positioning means comprises a cylindrical bearing surface 41 (A1) engaged in bearing surface 30 of shell 10 and having rising therefrom a cylindrical curved portion 32a forming the abutment means B1 on its concave surface 42 and engaged by the edge 41 of shell 10.

The second positioning means is constituted by a recess A2 defined by junction 43 in member 26 cooperating with the edge 44 in cover 11'. The axial abutment means B2 is formed by a plane bearing surface 45 of member 26 cooperating with a plane bearing surface 46 of cover 11'.

It is to be noted that portion 32a extends into the recess between plane rims 34', 33' of shells 10, 11' and is embedded in the weld bead 27.

Figure 5:
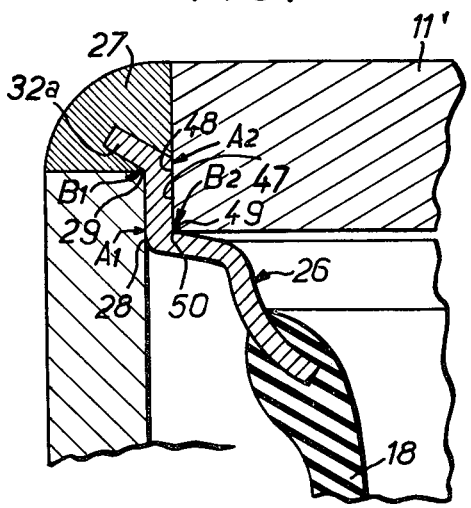

In the embodiment shown in FIG. 5, the first positioning means includes the centering means A1 and the axial abutment B1, as in FIG. 3 comprise the cylindrical bearing surface 28 of member 26 and the junction or recess 29 in member 26. The second positioning means comprises the cylindrical bearing surface 47 (A2) of member 26 cooperating with the cylindrical beafing surface 48 of cover 11', while the axial abutment means comprises the recess 50 in member 26 cooperating with the edge 49 of cover 11'. As in FIG. 4, portion 32a of member 26 is adapted to be embedded in weld bead 27.

Figure 6:
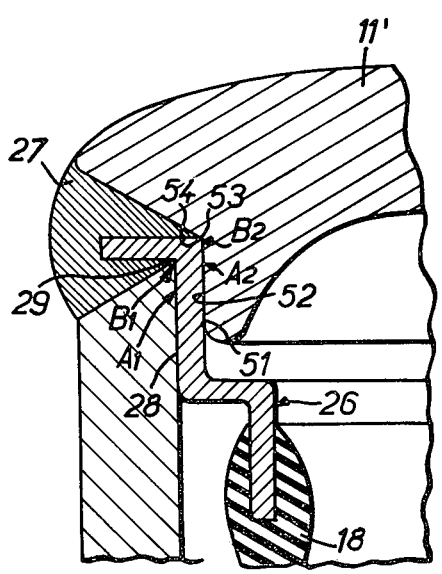

In the embodiment of FIG. 6, the first positioning means includes the centering means A1 and the axial abutment means B1 which comprise, as in FIG. 2, a cylindrical bearing surface 28 and a sharp recess 29 defined by a junction in member 26.

The second positioning means includes the centering means A2 which comprises the cylindrical bearing surface 51 of member 26 cooperating with a cylindrical bearing surface 52 of cover 11'. The axial abutment means B2 comprises the edge 53 of member 26 cooperating with a sharp recess in cover 11', the portion 32a of member 26 being embedded in weld bead 27.

Figure 7:
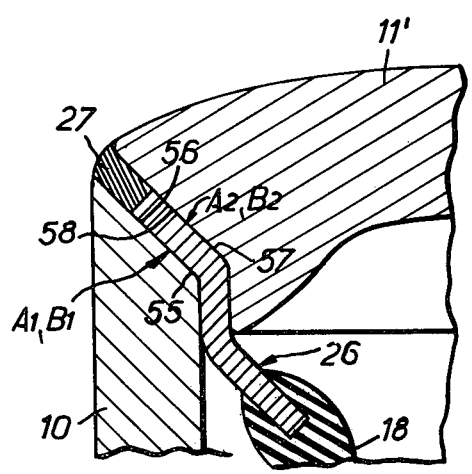

In the embodiment of FIG. 7 the means A1, B1 comprise the conical bearing surface 55 of member 26 cooperating with a conical bearing surface 56 defined by the rim of shell 10, while the means A2, B2 comprise the conical bearing surface 57 of member 26 cooperating with bearing surface 58 of cover 11'.

Having thus described my invention, what I claim as new and desire to secure by Letters Patent of the United States is:

1. In a pressure vessel comprising a rigid container having a substantially cylindrical body portion having a port at one end and a mouth having a rim at the other, and a cover member adapted to close said mouth and having a port, an annular supporting member in said container, a deformable partition having a rim bonded to said annular supporting member and positioned in said container for defining two variable volume fluid chambers therein in communication respectively with said ports, and weld means retaining said body portion, and said cover member in fixed position, the improvement comprising said supporting member having a first positioning means formed integral therewith cooperating with the mouth of said cylindrical body portion to center said supporting member and partition in said container, said supporting member having a second positioning means formed integral therewith and including a portion extending laterally outwardly at least over a portion of the rim of the body portion for cooperating with said cover member to position the latter in axial alignment with said body portion, and wherein said laterally extending portion is generally within said weld.

2. The combination set forth in claim 1 in which said annular supporting member has a mounting portion at its lower edge to which the rim of said partition is bonded, and a cylindrical centering portion spaced laterally outward from said mounting portion and of outer diameter just slightly less than the inner diameter of the mouth of said body portion so as to fit therein to center said supporting member, said supporting member including an abutment portion adapted to engage the rim of said body portion to limit the inward movement of said supporting member into said body portion, said centering portion and said abutment portion defining said first positioning means.

3. The combination set forth in claim 2 in which a spacer portion extends transversely outwardly at right angles to the axis of said supporting member between the upper edge of the mounting portion and the lower edge of said cylindrical centering portion.

4. The combination set forth in claim 2 in which said laterally outwardly extending portion is a frustoconical portion that extends outwardly and upwardly from the upper end of said cylindrical centering portion, the junction between said two portions defining an annular recess, and the rim of said body portion defines a sharp edge against which the recess abuts.

5. The combination set forth in claim 2 in which said laterally outwardly extending portion is a frustoconical portion that extends outwardly and upwardly from the upper edge of said cylindrical centering portion, the junction between said two portions defining an annular recess, and the rim of said body portion is beveled downwardly from its inner periphery, the latter defining a sharp edge against which the recess abuts.

6. The combination set forth in claim 1 in which said annular supporting member has a mounting portion at its lower edge to which the rim of said partition is bonded, and a cylindrical centering portion spaced laterally outward from said mounting portion and of outer diameter just slightly less than the inner diameter of the mouth of the body portion so as to fit therein to center said supporting member, the laterally extending portion of said supporting member being frustoconical and extending outwardly and upwardly from the upper edge of said cylindrical centering portion, the junction between said two portions defining an annular recess, and the rim of said body portion defines a sharp edge against which the recess abuts, said cover member having a beveled rim complementary to said frusto-conical portion and adapted to seat on the upper surface thereof.

7. The combination set forth in claim 6 in which the rim of the body portion is beveled downwardly from its inner periphery, the latter defining said sharp edge and the rim of said cover member is beveled upwardly from its inner periphery, the space between said two beveled rims defining a V-shaped recess having its apex directed inwardly, said frusto-conical portion having a flange extending outwardly from its outer edge into said V-shaped recess at right angles to the axis of said supporting member, said weld means filling said V-shaped recess.

8. The combination set forth in claim 2 in which said laterally outwardly extending portion is a frusto-conical portion that extends outwardly and upwardly from the upper end of said cylindrical centering portion, the junction between said two portions defining an annular recess, the rim of said body portion extends in a plane at right angles to the axis of said supporting member, the inner periphery of said rim defining a sharp edge against which the recess abuts.

9. The combination set forth in claim 8 in which the cover member has a beveled rim, the inner periphery of which defines a sharp edge abutting against the upper surface of said frusto-conical portion, the space between said two rims defining a substantially V-shaped recess, said frusto-conical portion extending into said recess and being spaced from said rims at its outer portion, said weld means filling said V-shaped recess.

10. The combination set forth in claim 1 in which said annular supporting member has a mounting portion at its lower edge to which the rim of said partition is bonded, and a cylindrical centering portion spaced laterally outward from said mounting portion and of outer diameter just slightly less than the inner diameter of the mouth of said body portion so as to fit therein to center said supporting member, a curved abutment portion extending from the upper edge of said cylindrical portion and flaring outwardly and having a concavity on its outer surface, the lower portion of which engages the inner periphery of the rim of the body portion.

11. The combination set forth in claim 10 in which the rim of said body portion extends in a plane at right angles to the axis of said supporting member, a spacer member extends laterally outward from the upper edge of said mounting portion at right angles to the axis of said supporting member, said curved abutment portion rising from the outer periphery of said spacer member, the lower portion of said abutment portion defining said cylindrical centering portion, said cover member having a rim extending in a plane parallel to the plane of said supporting member, the lower edge of said cover member abutting against the recess defined between said spacer portion and said curved abutment portion, the space between said rims defining a V-shaped recess into which said curved abutment portion extends, said weld means filling said V-shaped recess.

12. The combination set forth in claim 1 in which said annular supporting member has a mounting portion at its lower edge to which the rim of said partition is bonded, a spacer portion extends laterally outward from the upper edge of said mounting portion at substantially right angles to the axis of said supporting member, a cylindrical centering portion rises from the outer edge of said spacer portion, the junction between said spacer portion and said cylindrical portion defining a first annular recess, the outer diameter of said cylindrical portion being just slightly less than the inner diameter of the mouth of said body portion so as to fit therein to center said supporting member, and wherein a second frusto-conical portion extends outwardly and upwardly from the upper end of said centering portion, the junction between said conical portion and the centering portion defining a second annular recess, the rim of said body portion extends in a plane at right angles to the axis of said supporting member, the inner periphery of said rim defining a sharp edge against which said second recess abuts, the rim of said cover extending parallel to the axis of said supporting member, the lower edge of said cover member rim abutting against said second recess.

13. The combination set forth in claim 2 in which said laterally outwardly extending portion is a flange that extends outwardly from the upper edge of said cylindrical centering portion at right angles to the axis of said supporting member, the junction between said flange and said centering portion defining an annular recess, the rim of said body portion is beveled downwardly from its inner periphery, the latter defining a sharp edge against which the recess abuts, the inner periphery of the upper edge of said centering portion defining a sharp edge, said cover member having a depending cylindrical portion and defining an annular recess therebetween abutting against the edge of said cylindrical portion, the rims of said body portion and said cover member defining a V-shaped recess having its apex directed inwardly, said flange extending into said recess, said weld means filling said V-shaped recess.

14. The combination set forth in claim 2 in which said laterally outwardly extending portion is a frusto-conical portion that extends outwardly and upwardly from the upper end of said cylindrical centering portion, the junction between said two portions defining an annular recess, the rim of said body portion being beveled upwardly, said frusto-conical portion being seated on said rim, the recess abutting against the inner periphery of said rim, said cover member having a depending cylindrical portion adapted to fit into said cylindrical portion, and an upwardly and outwardly beveled rim rising from the upper edge of said cylindrical portion and defining an annular recess therebetween abutting against the inner edge of said cylindrical portion, said beveled rim resting on the top surface of the frusto-conical portion, the outer periphery of said frusto-conical portion being spaced inwardly from the outer peripheries of said juxtaposed rims to define a recess, and said weld means fills said recess.

* * * * *